(12) United States Patent
Tjorhom et al.

(10) Patent No.: US 8,504,220 B2
(45) Date of Patent: Aug. 6, 2013

(54) SYSTEMS AND METHODS FOR PROVIDING AN IN-TRAIL PROCEDURE SPEED DIRECTOR

(75) Inventors: Harold Tjorhom, Anthem, AZ (US); James Redmond, Glendale, AZ (US); Zachary R. Reynolds, Peoria, AZ (US); Cyro A. Stone, Peoria, AZ (US); Christopher Polynin, Phoenix, AZ (US); Charles C. Manberg, Peoria, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 0 days.

(21) Appl. No.: 12/756,096

(22) Filed: Apr. 7, 2010
(Under 37 CFR 1.47)

(65) Prior Publication Data
US 2011/0144833 A1    Jun. 16, 2011

Related U.S. Application Data

(60) Provisional application No. 61/167,496, filed on Apr. 7, 2009.

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ................................................................ 701/3

(58) Field of Classification Search
None
See application file for complete search history.

(56) References Cited

U.S. PATENT DOCUMENTS

| | | | | |
|---|---|---|---|---|
| 6,393,358 | B1 * | 5/2002 | Erzberger et al. | 701/120 |
| 7,382,285 | B2 * | 6/2008 | Horvath et al. | 340/961 |
| 7,570,178 | B1 * | 8/2009 | Whalen et al. | 340/961 |
| 2009/0083368 | A1 * | 3/2009 | Stayton et al. | 709/202 |
| 2010/0332054 | A1 * | 12/2010 | Brandao et al. | 701/3 |
| 2011/0066362 | A1 * | 3/2011 | He | 701/120 |
| 2011/0187588 | A1 * | 8/2011 | Khatwa et al. | 342/26 B |
| 2011/0224847 | A1 * | 9/2011 | Singer et al. | 701/4 |

OTHER PUBLICATIONS http://www.nianet.org/Publications/Technical-Reports/pdfs/2007/2007-06tmp-r1.aspx.*
http://www.nianetorg/Publications/Technical-Reports/pdfs/2007/2007-06tmp-rl.aspx.*

* cited by examiner

*Primary Examiner* — Khoi Tran
*Assistant Examiner* — Harry Oh
(74) *Attorney, Agent, or Firm* — Allen J. Moss; Squire Sanders (US) LLP

(57) ABSTRACT

Embodiments of the present invention enhance existing ITP (In-Trail Procedure) algorithms by providing additional information to the flight crew. The additional information may enable the flight crew to appropriately modify own aircraft airspeed, and thereby, ground speed, in order to qualify for ITP procedures.

5 Claims, 2 Drawing Sheets

Current ITP Display

ITP NOT AVAILABLE
Estimate until Available. 00:15:21

Enhanced ITP Display

ITP NOT AVAILABLE
Estimate until Available:

Current Speed   (480 knots)    00:15:21
Increase Speed  +25 knots      00:04:15
Decrease Speed  -15 knots      00:06:13

FIGURE 2

SYSTEMS AND METHODS FOR PROVIDING AN IN-TRAIL PROCEDURE SPEED DIRECTOR

CROSS REFERENCE TO RELATED APPLICATIONS

This application is related to and claims priority from U.S. provisional patent application No. 61/167,496, filed Apr. 7, 2009, in the name of the same inventors and entitled "SYSTEMS AND METHODS FOR PROVIDING AN IN-TRAIL PROCEDURE SPEED DIRECTOR" and which is herein incorporated by reference in its entirety.

BACKGROUND OF THE INVENTION

1. Field of the Invention

The present invention relates to avionics systems, and more particularly, to systems and methods for providing an in-trail procedure (ITP) speed director.

2. Description of the Related Art

Current ITP algorithms are based on calculations of ITP distance (lateral distance to crossing points) and the ground speed (GS) of all the aircraft in the area of interest. Such current ITP algorithms determine whether ITP is available or not and provide the flight crew with an indication of availability for ITP, e.g., ITP Available or ITP Not Available. If ITP is available, the crew may request an altitude change for safety, efficiency or comfort reasons. If ITP is not available, current ITP algorithms provide an estimated time until ITP is available. Depending on relative geometry and airspeed between ownship and other aircraft, this could be a substantial time.

Thus, a need exists for improved ITP systems and methods which overcome these and other problems.

SUMMARY OF THE INVENTION

Embodiments of the present invention enhance existing ITP algorithms by providing additional information to the flight crew. The additional information may enable the flight crew to appropriately modify own aircraft airspeed, and thereby, ground speed, in order to qualify for ITP procedures.

It is to be understood that both the foregoing general description and the following detailed description are exemplary and explanatory only and are not restrictive of the invention, as claimed.

The accompanying drawings, which are incorporated in and constitute a part of this specification, illustrates several embodiments of the invention and together with the description, serve to explain the principles of the invention.

BRIEF DESCRIPTION OF THE DRAWINGS

FIG. 2 is simplified diagram depicting displayed information, in accordance with systems and methods consistent with the present invention.

DESCRIPTION OF THE EMBODIMENTS

Figure 1:
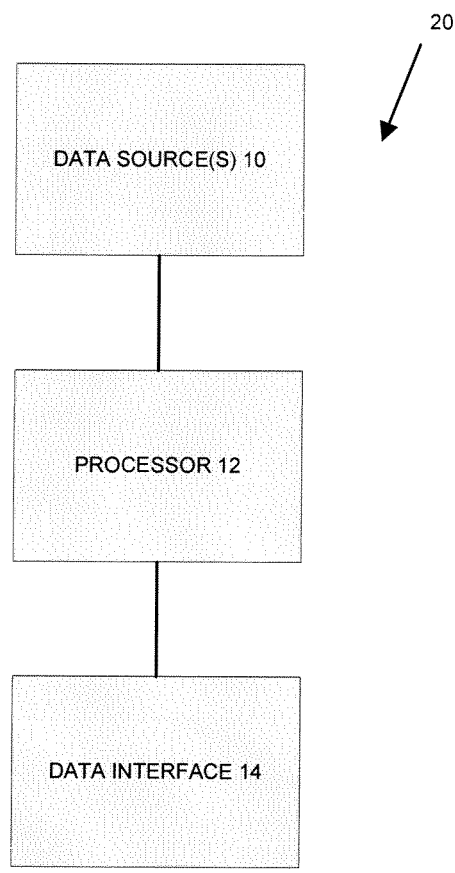
FIG. 1 is simplified system block diagram, in accordance with systems and methods consistent with the present invention.

Reference will now be made in detail to the present exemplary embodiments of the invention, examples of which are illustrated in the accompanying drawings.

Embodiments of the present invention provide means for reducing the time until ITP is available by providing the crew a recommended airspeed to adjust GS. Embodiments of the present invention may prompt the crew to either increase or decrease their airspeed in order to more rapidly attain an ITP Available condition. The recommended airspeed calculation may be based on the relative geometry and GS of ownship and other aircraft within the ITP boundaries. The calculation could provide a best case "increase" airspeed and/or a best case "decrease" airspeed wherein the computed best case airspeed(s) are constrained by aircraft performance limits as well as speed limits imposed on the aircraft by procedure, e.g., when transiting the ocean or Australia. Estimated time to an ITP Available condition could also be provided. Speed commands to maximize ITP allowed time could also be included.

The speed limits for the ITP speed director could be validated by using known aircraft limits from a Flight Management System, for example The ITP speed director could then use speed recommendations based on actual aircraft performance capabilities. This may include and is not limited to aircraft speed limits (mach maximum operational speed, maximum operational speed and stall speed), altitude ceiling, possible vertical speed performance, fuel burning performance and estimated time of arrival considerations.

Referring to FIG. 1, a simplified system block diagram is shown, in accordance with systems and methods consistent with the present invention. System 20 may employ any one or more of a plurality of data sources 10, e.g., ADS-B data, which may be input to one or more processors 12. Processor 12 may perform operations on the provided data 10 in accordance with instructions provided to the processor 12 to produce data 14 for use by a user. Data 14 may be used to provide information (orally and/or visually) to a user for use in evaluating whether an associated aircraft can execute an ITP and/or assisting the associated aircraft to reaching a position of eligibility for an ITP.

For example, information that may be provided to the crew using current ITP algorithms and using embodiments of the present invention are shown in FIG. 2. On the left half of FIG. 2, under the heading "Current ITP Display," one sees that under current ITP systems, when an aircraft is not currently eligible for an ITP, a message is displayed "ITP NOT AVAILABLE," as well as an estimated time until ITP is available. On the right half of FIG. 2, under the heading "Enhanced ITP Display," one sees that under an enhanced ITP system in accordance with embodiments of the present invention, when an aircraft is not currently eligible for an ITP, a message may be displayed "ITP NOT AVAILABLE," as well as an estimated time until ITP is available under current speed and estimated times until ITP is available under revised speeds (up and down). For example, one can see that at an increased speed of 505 knots, the estimated time until ITP is available is 4 minutes and 15 seconds, the shortest time displayed. Thus, the pilot may increase speed by 25 knots and more quickly become eligible for an ITP. In one embodiment of the present invention, the displayed speed increase is that speed increase which most quickly reaches ITP eligibility, while the displayed speed decrease is that speed decrease which most quickly reaches ITP eligibility. In other words, for a range of potential speed increases and speed decreases, there should be an optimum speed increase and speed decrease, respectively, for reaching ITP eligibility.

Enhancements associated with embodiments of the present invention will increase the usability of existing ITP algorithms by helping a crew make slight speed modifications to more quickly qualify for ITP altitude changes.

Functionality associated with embodiments of the present invention could be combined with a tradeoff assessment display in the ITP functionality pages. This tradeoff display could potentially include the following information:

Pilot airspeed choices that are attainable.
Pilot selected altitude level.
Fuel savings at desired flight level.
Mileage and time at new desired flight level.
Fuel needed to reach desired altitude including speed changes.
Net fuel delta calculation based on the above calculations so that the flight crew can properly assess if an in trail procedure is predicted to result in a net fuel saving.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims, whether filed herewith or at a later time in this or in any related application.

What is claimed is:

1. A system for use in executing an ITP (In-Trail Procedure), the system comprising:
   a processor receiving data for use in evaluating availability of an ITP; and
   a display for showing whether the ITP is available and when the ITP is unavailable a range of times until the ITP is available, the range of times until ITI is available comprising at least two times until ITI is available wherein each of the at least two times until ITI is available is determined using a different speed to reach ITP availability.

2. The system of claim 1 wherein one of the at least two times until ITI is available is determined using a current speed of an aircraft.

3. The system of claim 2 wherein the other of the at least two times until ITI is available is determined using a speed higher than the current speed of the aircraft.

4. The system of claim 2 wherein the other of the at least two times until ITI is available is determined using a speed lower than the current speed of the aircraft.

5. The system of claim 1 wherein one of the at least two times until ITI is available is determined using a current speed of an aircraft, the other of the at least two times until ITI is available is determined using a speed higher than the current speed of the aircraft and a third time until ITI is available is determined using a speed lower than the current speed of the aircraft.

* * * * *